United States Patent
Pesarese (10) Patent No.: US 10,671,411 B2
(45) Date of Patent: Jun. 2, 2020

(54) CLONING FOR OBJECT-ORIENTED ENVIRONMENT

(71) Applicant: SAP SE, Walldorf (DE)

(72) Inventor: Marco Pesarese, Nussloch (DE)

(73) Assignee: SAP SE, Walldorf (DE)

( * ) Notice: Subject to any disclaimer, the term of this patent is extended or adjusted under 35 U.S.C. 154(b) by 7 days.

(21) Appl. No.: 15/991,036

(22) Filed: May 29, 2018

(65) Prior Publication Data

US 2019/0370014 A1    Dec. 5, 2019

(51) Int. Cl.
| | |
|---|---|
| *G06F 8/20* | (2018.01) |
| *G06F 9/448* | (2018.01) |
| *G06F 9/46* | (2006.01) |
| *G06F 16/28* | (2019.01) |

(52) U.S. Cl.
CPC ............ *G06F 9/4488* (2018.02); *G06F 9/465* (2013.01); *G06F 16/289* (2019.01)

(58) Field of Classification Search
CPC ....... G06F 9/4488; G06F 16/289; G06F 9/465
See application file for complete search history.

(56) References Cited

U.S. PATENT DOCUMENTS

| | | | | |
|---|---|---|---|---|
| 5,642,511 | A * | 6/1997 | Chow | ................. G06F 8/38 717/105 |
| 8,832,035 | B2 * | 9/2014 | Raj | ................. G06F 3/0608 707/664 |
| 9,413,826 | B1 * | 8/2016 | Dietz | ................. G06F 16/162 |
| 2005/0022208 | A1 * | 1/2005 | Bolar | ................. H04L 41/0226 719/315 |
| 2012/0130949 | A1 * | 5/2012 | Picken | ................. G06F 16/178 707/626 |
| 2016/0004720 | A1 * | 1/2016 | Tabaaloute | ................. H04L 67/1095 707/639 |
| 2017/0366609 | A1 * | 12/2017 | Dieterich | ................. G06F 16/178 |

* cited by examiner

*Primary Examiner* — Andy Ho
*Assistant Examiner* — Abdou K Seye
(74) *Attorney, Agent, or Firm* — Buckley, Maschoff & Talwalkar LLC (57) ABSTRACT

Provided are systems and methods for generating a copy of an object in an object-oriented programming architecture. In one example, the method may include one or more of receiving a command to copy a model object comprising a hierarchical object-oriented architecture that references one or more underlying data objects, freezing a state of the one or more underlying data objects to generate a frozen data store of underlying object data, generating a first proxy object that references the frozen data store and a second proxy object that references the frozen data store, modifying the model object to reference the first proxy object instead of referencing the one or more underlying data objects, and generating a copy of the model object that references the second proxy object and storing the copy of the model object.

17 Claims, 7 Drawing Sheets

CLONING FOR OBJECT-ORIENTED ENVIRONMENT

BACKGROUND

Object-oriented programming, also referred to as OOP, is a computer programming paradigm based on the concept of objects. A computer program may be designed from many different objects having different functions. An object may include data in the form of attributes (fields) and code in the form of procedures (methods). Typically, an object's methods can access and modify data fields of other objects with which they are associated. In OOP, computer programs are designed by making them out of objects that interact with one another. There is significant diversity of OOP languages, but the most popular are class-based in that objects are instances of classes, which typically also determine their type. A class can provide a definition for a data format and available procedures for a given type or class of object. In some cases, classes may also contain data and procedures known as class methods. Meanwhile, an object is an instance of a class.

Object copying is a process of creating a copy of an existing object. The resulting copy may be referred to as an object copy. Copying is a basic idea but has subtleties and can have significant overhead. The design goal of most objects is to give the resemblance of being made out of one monolithic block even though the object is not a single block but rather a composite of data from multiple underlying data objects. Because objects are made up of several different parts or layers, copying can be difficult. There are several ways to copy an object, most commonly by a copy constructor or cloning. One method of copying an object is the shallow copy. In this case, a new object is created, and the field values of the original object are copied over to the new object. This is also referred to as a field-by-field copy. Another copy method is a deep copy in which fields are de-referenced rather than references to objects being copied. In this example, new copy objects are created for any de-referenced objects, and references to the new copy objects are placed in the new object. Other copy processes exist including hybrids of the shallow and deep copy procedures. In any case, the copy of an object creates a redundant storage of the underlying data of the object and also require significant processing time and resources to perform the operation. Accordingly, a better method of cloning an object is needed.

BRIEF DESCRIPTION OF THE DRAWINGS

Features and advantages of the example embodiments, and the manner in which the same are accomplished, will become more readily apparent with reference to the following detailed description taken in conjunction with the accompanying drawings.

Throughout the drawings and the detailed description, unless otherwise described, the same drawing reference numerals will be understood to refer to the same elements, features, and structures. The relative size and depiction of these elements may be exaggerated or adjusted for clarity, illustration, and/or convenience.

DETAILED DESCRIPTION

In the following description, specific details are set forth in order to provide a thorough understanding of the various example embodiments. It should be appreciated that various modifications to the embodiments will be readily apparent to those skilled in the art, and the generic principles defined herein may be applied to other embodiments and applications without departing from the spirit and scope of the disclosure. Moreover, in the following description, numerous details are set forth for the purpose of explanation. However, one of ordinary skill in the art should understand that embodiments may be practiced without the use of these specific details. In other instances, well-known structures and processes are not shown or described in order not to obscure the description with unnecessary detail. Thus, the present disclosure is not intended to be limited to the embodiments shown, but is to be accorded the widest scope consistent with the principles and features disclosed herein.

The example embodiments are directed to a system and method which implement a new mechanism for copying an object within an object-oriented architecture such as a visual analytics object-oriented application programming interface (API), or the like. Related copy procedures require underlying data objects of a model object to be copied and stored with the model object copy. As a result, a significant amount of redundant data is created because common data elements are stored in both the original object and the copy of the object resulting in a significant waste of resources. In addition, the copying process consumes valuable processor (e.g., more than a minute, etc.) as the system copies underlying data objects which can include many data objects each with multiple fields of data.

The example embodiments overcome these drawbacks by freezing a current state of the data included in an object to be copied, generating a proxy object which references the frozen state of the object data, and changing the original object to reference the proxy object. In other words, the system creates an intermediate proxy object between the object and its underlying data. Furthermore, a new copy of the object and a second proxy object can be created where the new copy references the second proxy object. Similar to the first proxy object, the second proxy object may also reference the frozen state of the data of the original object. Accordingly, the copy process does not require underlying data to be copied and stored redundantly but instead modifies the original object to separate the underlying data from the model. The system also maintains a query definition with the object-oriented API through the inclusion of the proxy object.

Figure 1A:
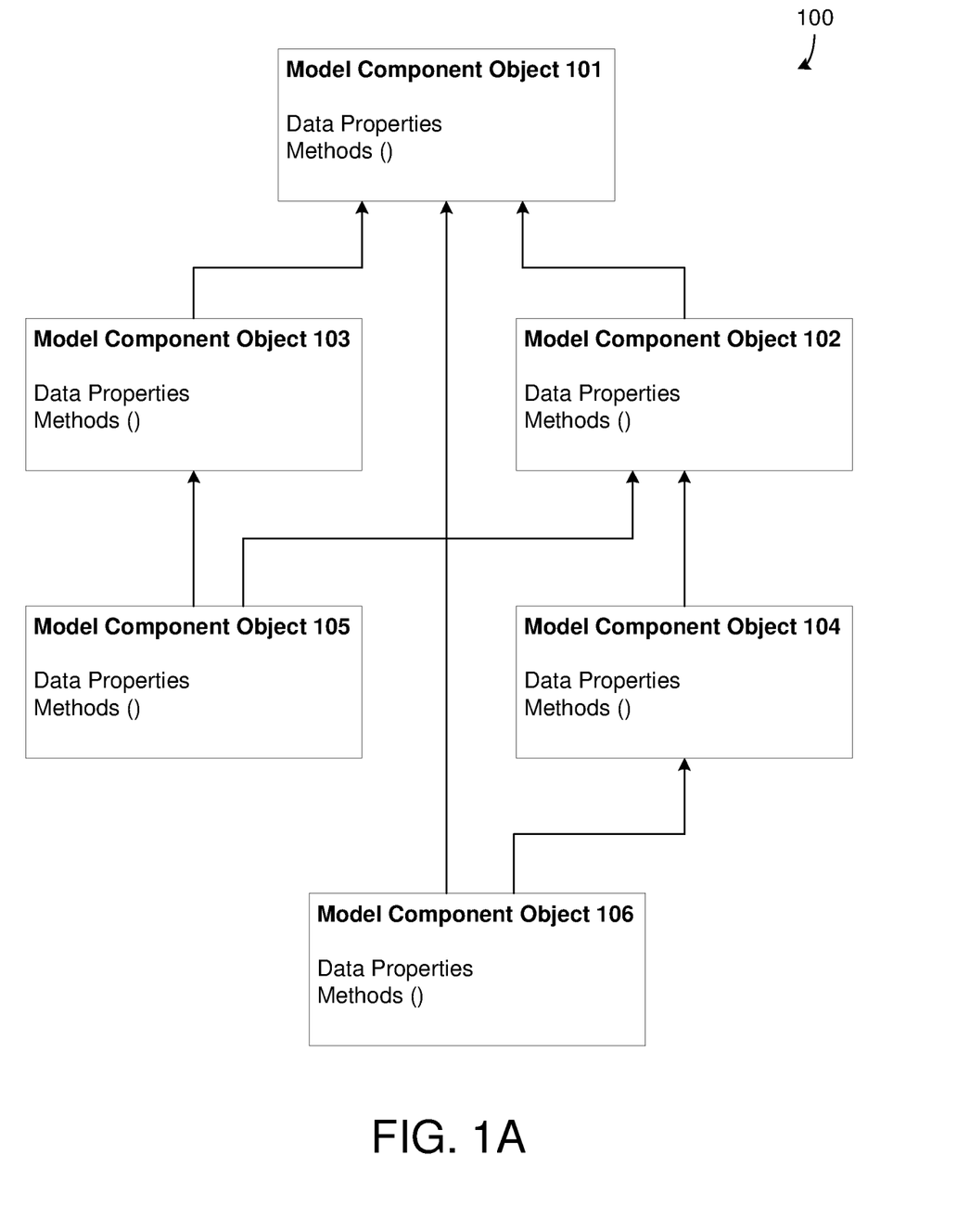
FIG. 1A is a diagram illustrating an object-oriented programming model in accordance with an example embodiment.

FIG. 1A illustrates an example of object-oriented programming (OOP) model 100 in accordance with an example embodiment. Referring to FIG. 1, the OOP model 100 includes a plurality of model objects 101, 102, 103, 104, 105, and 106, which interact with each other as indicated by the pointers to create a program. As a non-limiting example, the OOP model 100 may be a software program included within an analytics visualization application including multiple user interface model objects, however, embodiments are not limited thereto. In the example of FIG. 1, the model objects 101-106 each include data attributes (fields) and data methods (procedures). Methods in a first model object (e.g., model object 105) may be used to select and modify data attributes in an associated second model object (e.g., model objects 102 or 103). It should also be understood that model objects may point to multiple other model objects.

Figure 1B:
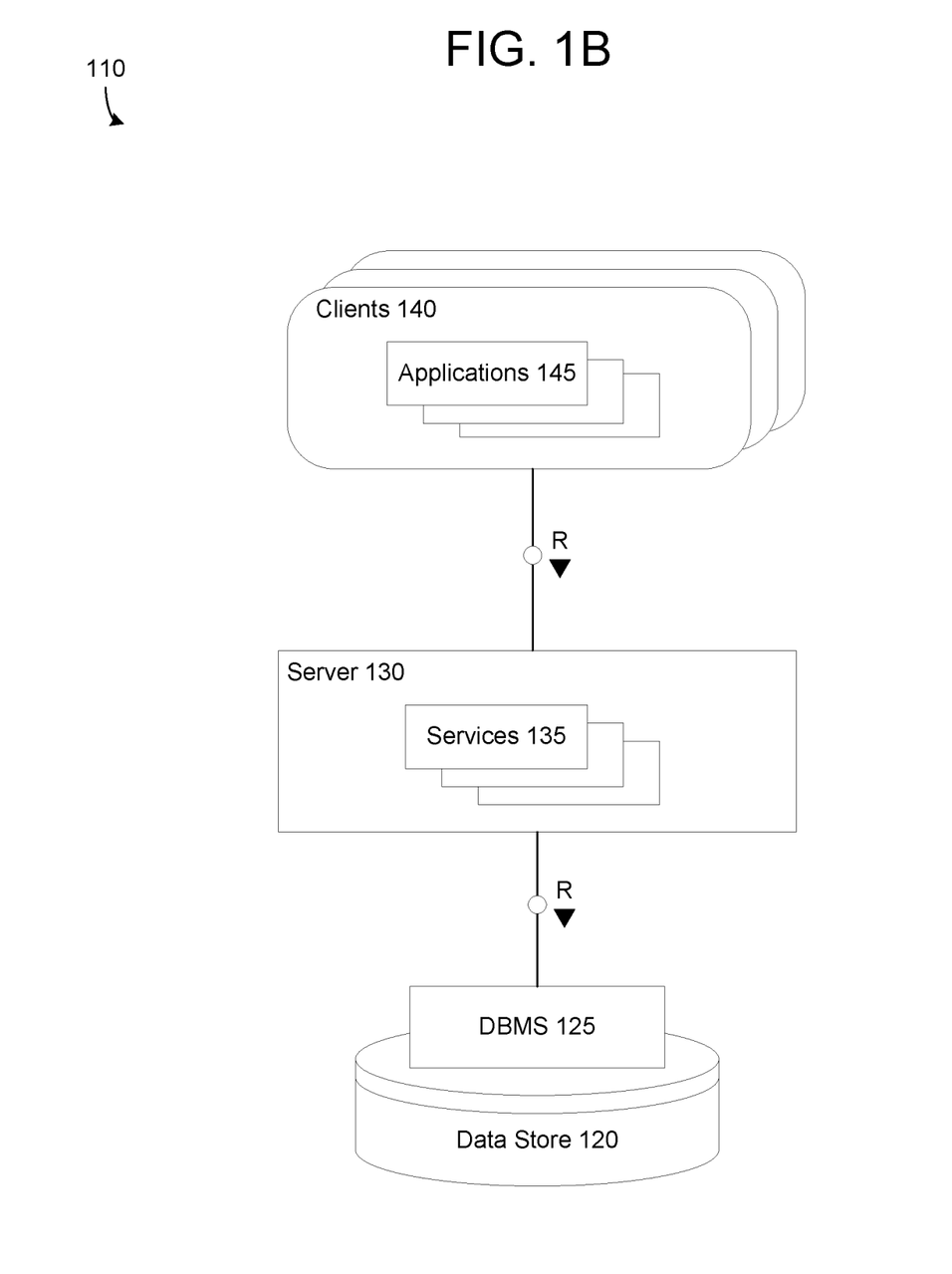
FIG. 1B is a diagram illustrating a database system architecture in accordance with an example embodiment.

FIG. 1B illustrates a system architecture of a database 110 in accordance with an example embodiment. It should be appreciated that the embodiments are not limited to architecture 110 or to a database architecture, however, FIG. 1B is shown for purposes of example. Referring to FIG. 1B, the architecture 110 includes a data store 120, a database management system (DBMS) 125, a server 130, services 135, clients 140 and applications 145. Generally, services 135 executing within server 130 receive requests from applications 145 executing on clients 140 and provides results to applications 145 based on data stored within data store 110. For example, server 130 may execute and provide services 135 to applications 145. Services 135 may comprise server-side executable program code (e.g., compiled code, scripts, etc.) which provide functionality to applications 145 by providing user interfaces to clients 140, receiving requests from applications 145 (e.g., drag-and-drop operations), retrieving data from data store 110 based on the requests, processing the data received from data store 110, and providing the processed data to applications 145.

In one non-limiting example, an application 145 may interact with data from the data store 120 to perform various operations. The data store 120 may store object models described herein (e.g., object models 101-106, etc.) as well as the underlying data store which includes a current model, default model, metadata, and the like. For example, a client 140 may execute an application 145 to perform visual analysis of analytical data stored in the data store 120 based on the models causing analytic data to be output to a user interface on a display of the client 140 which allows the user to view analytical information such as charts, graphs, tables, and the like, of the analytic data. The application 145 may pass analytic information based on the input to one of services 135. An SQL script may be generated based on the request and forwarded to DBMS 125. DBMS 125 may execute the SQL script to return a result set based on data of data store 120, and the application 145 creates a report/visualization based on the result set. As another example, the analytic data may be input by the user and provided directly from the application 145 to the DBMS 125 or the data store 120.

The services 135 executing on server 130 may communicate with DBMS 120 using database management interfaces such as, but not limited to, Open Database Connectivity (ODBC) and Java Database Connectivity (JDBC) interfaces. These types of services 135 may use Structured Query Language (SQL) to manage and query data stored in data store 120. The DBMS 125 serves requests to query, retrieve, create, modify (update), and/or delete data of data store 120, and also performs administrative and management functions. Such functions may include snapshot and backup management, indexing, optimization, garbage collection, and/or any other database functions that are or become known.

Server 130 may be separated from or closely integrated with DBMS 125. A closely-integrated server 130 may enable execution of services 135 completely on the database platform, without the need for an additional server. For example, server 130 may provide a comprehensive set of embedded services which provide end-to-end support for Web-based applications. The services 135 may include a lightweight web server, configurable support for Open Data Protocol, server-side JavaScript execution and access to SQL and SQLScript. Server 130 may provide application services (e.g., via functional libraries) using services 135 that manage and query the data of data store 120. The application services can be used to expose the database data model, with its tables, views and database procedures, to clients 140. In addition to exposing the data model, server 130 may host system services such as a search service.

Data store 120 may comprise any query-responsive data source or sources that are or become known, including but not limited to a structured-query language (SQL) relational database management system. Data store 120 may include a relational database, a multi-dimensional database, an Extensible Markup Language (XML) document, or any other data storage system storing structured and/or unstructured data. The data of data store 120 may be distributed among several relational databases, dimensional databases, and/or other data sources. Embodiments are not limited to any number or types of data sources. In some embodiments, the data of data store 120 may include one or more of conventional tabular data, row-based data, column-based data, and object-based data. For example, the data store 120 may store the objects described in the examples herein. Moreover, the data may be indexed and/or selectively replicated in an index to allow fast searching and retrieval thereof. Data store 120 may support multi-tenancy to separately support multiple unrelated clients by providing multiple logical database systems which are programmatically isolated from one another.

The architecture 110 may include metadata defining objects which are mapped to logical entities of data store 120. The metadata be stored in data store 120 and/or a separate repository (not shown). The metadata may include information regarding dimension names (e.g., country, year, product, etc.), dimension hierarchies (e.g., country, state, city, etc.), measure names (profit, units, sales, etc.) and any other suitable metadata. According to some embodiments, the metadata includes information associating users, queries, query patterns and visualizations. The information may be collected during operation of system and may be used to determine a visualization to present in response to a received query, and based on the query and the user from whom the query was received.

Each of clients 140 may include one or more devices executing program code of an application 145 for presenting user interfaces to allow interaction with application server 130. The user interfaces of applications 145 may comprise user interfaces suited for reporting, data analysis, and/or any other functions based on the data of data store 120. Presentation of a user interface as described herein may include any degree or type of rendering, depending on the type of user interface code generated by server 130. For example, a client 140 may execute a Web Browser to request and receive a Web page (e.g., in HTML format) from application server 130 via HTTP, HTTPS, and/or Web Socket, and may render and present the Web page according to known protocols. One or more of clients 140 may also or alternatively present user interfaces by executing a standalone executable file (e.g., an .exe file) or code (e.g., a JAVA applet) within a virtual machine.

Analytics applications have evolved from specialized tools for experts only to more general visualization platforms where large hardware display screens are built to give decision makers insight into hundreds of thousands of information fragments. This pushes the existing client technologies and application models to their limits, especially when restrictions such as browser-based runtime environments exist. On one hand, the existing object-oriented architecture of analytics API's cover the business domain very well. Furthermore, there is already a huge existing dependency of client code. Therefore, fundamental changes of such an API (or the signatures inside) is not desirable because it would require significant changes to already existing code. On the other hand, a transition to a faster cloning approach is needed because todays business scenarios (like the mentioned dashboard-walls) require an increasing number of different visualizations from the same base data provider. Performance measurements often view the process of model cloning as major bottleneck, hence any optimizations are a benefit for the complete client application. The example embodiments may combine both the classic object oriented API with a superfast cloning solution without much compromise for speed or disruptive architecture changes.

To allow fast scalable cloning of a query definition which may include hundreds of objects and thousands of properties, the underlying primitive values are no longer copied by the example embodiments, but instead made constant (frozen) and newly referenced. If a value is not existing in a given data store, a lookup in the parent store is done. All properties are flattened, hence the hierarchy of objects is made into a linear or flat key/value representation, where a property can be found, for example, via a combination of type, object id and property name. Furthermore, the existing object-oriented query definition API may be maintained and may remain unchanged. This is realized by having a lightweight shadow proxy-like object which may initially be empty except for an object ID and a data store reference as dynamic part (instead of a heavy-weight composite data object with all properties as language variables). Together with the static type of the object all properties can be found inside the store.

In addition, objects that are not directly used may be lazy initialized, which allows a cloning with constant (and short) processing time. If the API offers access to references objects, for example as lists or maps, these may be converted internally as second-tier storage. Primary is the storage of a type/ID or just an ID reference. With this approach fast cloning as well as the realization of model-on-model definition, hence creating a virtual new model with just a few changes, allowing all other changes be taken from a parent model. Cloning such a model may include a traverse of the complete underlying data store chain to create a frozen store chain, where all non-frozen stores are replaces by empty new stores that reference the frozen stores. This approach prevents differences between metadata and model definition. Metadata may be the first referenced frozen store. Resetting a model refers to cleaning the dynamic store and cleaning all object proxy references.

One classic problem of existing architecture is the difficulty to persist just the delta of an model object. Currently the complete model is saved, leading to problems when the underlying initial model is changed and these changes should be reflected in updated application execution. The system of the example embodiments, may identify only the changes to the original model and allow the changes to be selectively saved. Eventing may be solved by separating global model changes from underlying data changes. In addition, user interface (UI) components may attach to a model object and only changes in the underlying proxy data store are taken into account to refresh the result set of the UI component.

Figure 2:
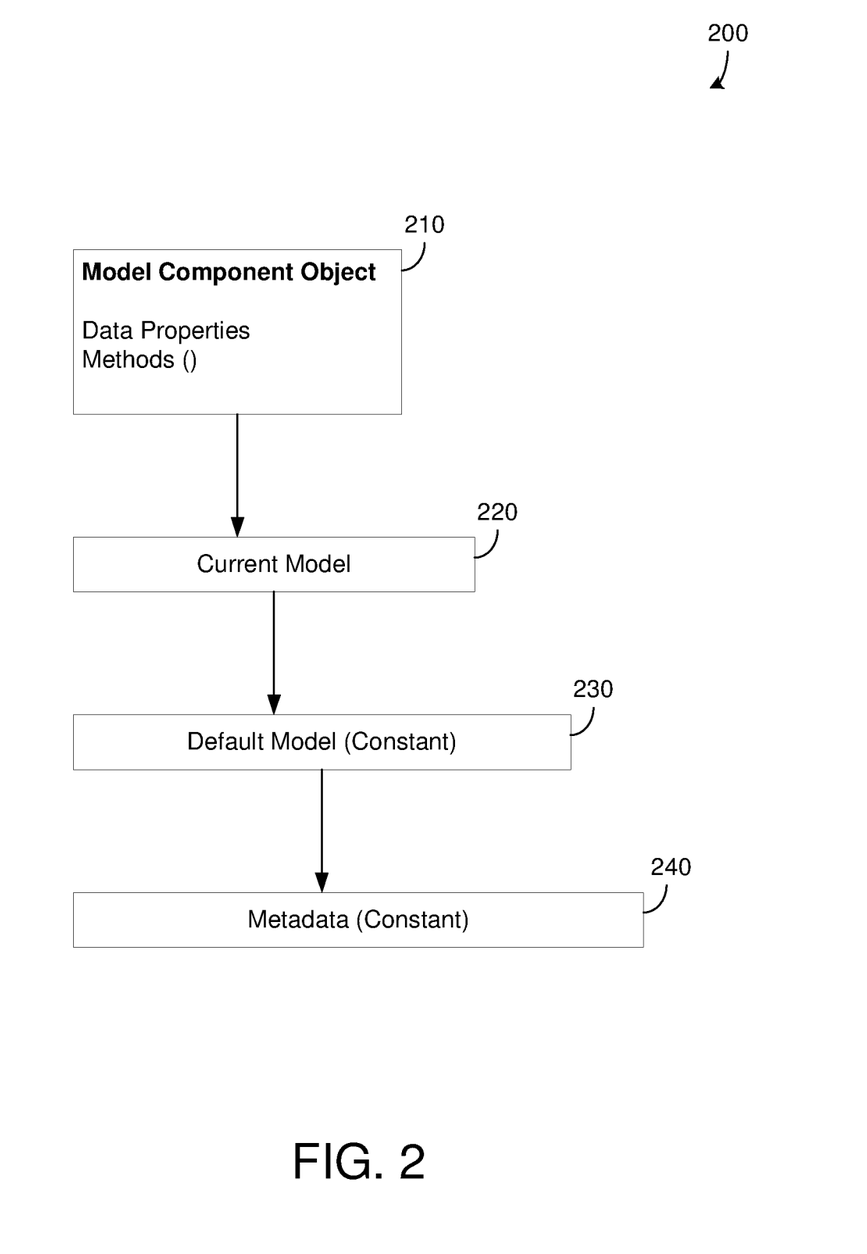
FIG. 2 is a diagram illustrating a data architecture of a model object in accordance with an example embodiment.

FIG. 2 illustrates an example of a data architecture 200 for a model object in accordance with an example embodiment. Referring to FIG. 2, the model object 210 is composed of a current model 220, a default model 230, and a metadata model 240. It should be appreciated that these layers are merely for purposes of example, and may include additional or different layers than what is shown in FIG. 2. In this example, the default model 230 represents the initialized data model with default values for attributes. Attributes may have various values such as integers, floats, arrays, graphs, etc. The default model 230 may be a constant value that does not dynamically change over time. Meanwhile, the current model 220 may include any changes to the model object 210 that are made with respect to the default model 230. In other words, the current model 220 may be dynamic and change over time. The metadata model 240 may include metadata about the model object 210. For example, the metadata model 240 may include information about a program structure itself within the model object 210 such as classes, methods, attributes, and the like. For example, a class may have intrinsic metadata such as its name, a superclass, an interface, methods, attributes, or the like. The metadata within metadata model 240 may be used for source code generation, compile-time verification, class transformations, and the like.

In the class implementation of a model component 210 may be a set of primitive boolean, integer, double, string, and/or constant properties beside references to other model components. Also, there may exist lists and maps to other components. All properties rely on underlying keys to access them. The combination of a ("this") model component type and it's name must be model-wide unique and serves as a model-wide component identifier (CID) inside the storage. All three information together can get and set a property. Each property can be accessed for defaulting on layers below. Based on the hierarchical model shown in FIG. 2, a state of the model object can be converted into a flat model storage which is referred to in some examples herein as a frozen data store.

Below, is an example of how to manipulate a boolean property (code 1).

```
boolean inputValue = true;
boolean outputValue;
Origin:
    this.m__myProperty = inputValue;
    outputValue = this.m__myProperty;
Cloning Storage:
    this.m__globalStorage.setBoolean( this.getType( ), this.getId( ),
    "<PropertyName>", inputValue );
    outputValue = this.m__globalStorage.getBoolean( this.getType( ),
    this.getId( ), "<PropertyName>" );
This can also be written using the component identifier "CID" as:
    this.m__globalStorage.setBoolean( this.getCid( ),
    "<PropertyName>", inputValue );
    outputValue = this.m__globalStorage.getBoolean( this.getCid( ),
    "<PropertyName>" );
```

Internally the storage can combine the three strings into a single key for faster lookup. As a result, the access is now to an object rather than a primitive value. Furthermore, the storage can be combined with a lazy object instantiation, which does not require time to create new objects but rather objects are created when needed. Therefore, when an object is references, its CID may be used.

```
    ModelComponentXY inputObject = ...;
    ModelComponentXY outputObject;
Origin:
    this.m__objectReference = inputValue;
    outputValue = this.m__objectReference;
Cloning Storage:
    this.m__globalStorage.setString( this.getCid( ),
    "<PropertyName>", inputObject.getCid( ) );
    String objCid = this.m__globalStorage.getString( this.getCid( ),
    "<PropertyName>" );
    if( objCid != null )
    {
        outputObject = (ModelObjectXY)
        this.m__globalStorage.lookupObject( objCid );
        if( outputObject == null )
        {
        ... // create a new one and store it
        }
    }
    else
    {
    outputObject = null;
    }
```

In case the objCid is null, the outputObject may be null as there is no reference. Also, the creation of a new object may be done automatically inside the store using a set of factories. The objCid contains the type of the object. This may be used to choose the appropriate factory and create a new object without using any code in the class. This requires the objCid to have a delimiter inside of it to identify the type. For example, objCid="Type-ID". For each class a factory can exist, stored inside a map and accessible via the type as a key. In the end, it may look like this:

```
    outputObject = (ModelObjectXY)
    this.m__globalStorage.getModelComponent( this.getCid( ),
    "<PropertyName>" );
```

Event binding may be accounted for according to various embodiments. For example, events that occur to a child object may be propagated to a parent object. For example, an event registration may be performed to trigger a recursive binding of all shadow objects. This process might be simplified by keeping track of all child objects in a generic list. Also, lists and maps of objects can have eventing attached. The lists and/or maps may store references to objects and only create the object if they are accessed.

Figure 3:
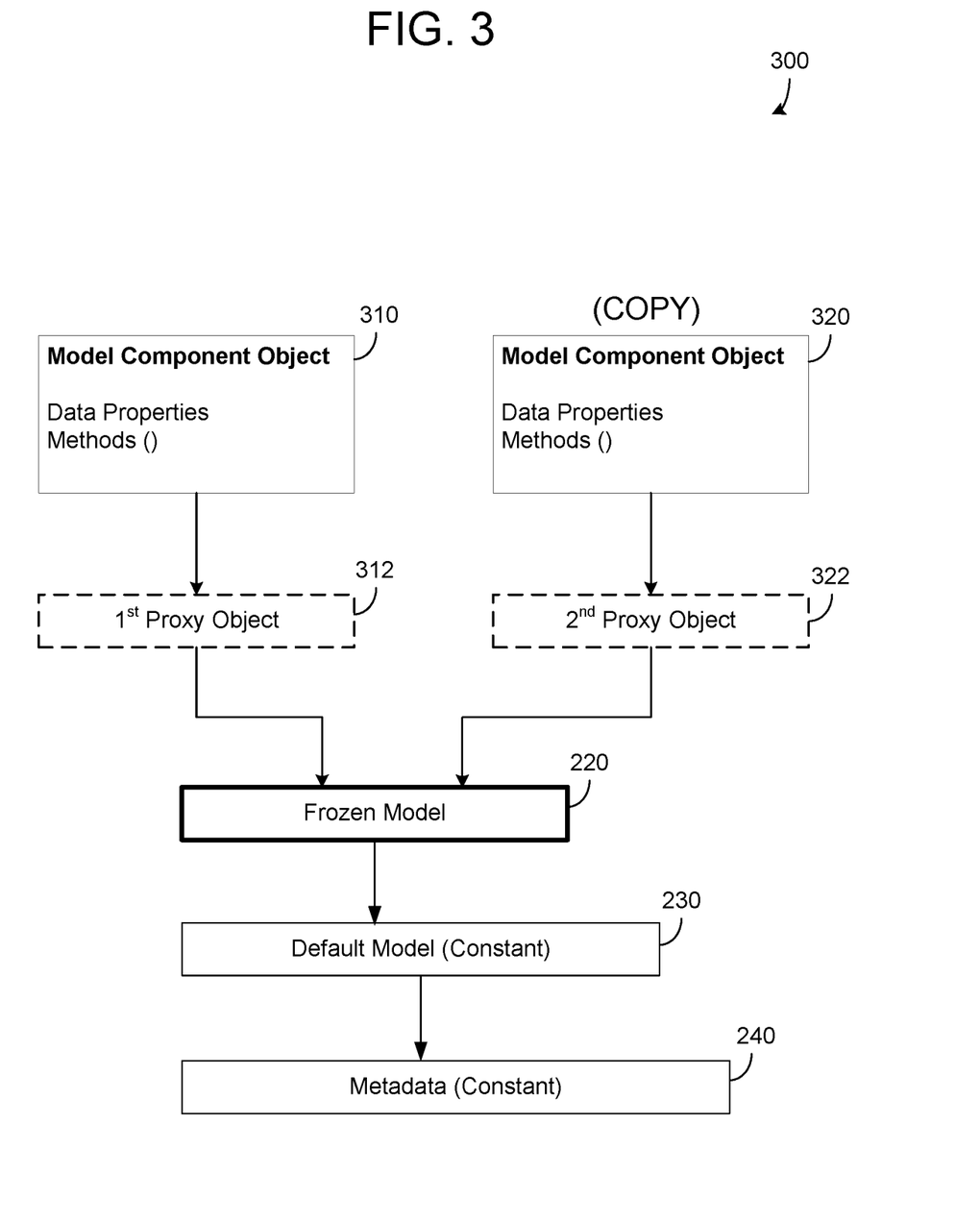
FIG. 3 is a diagram illustrating a process of copying a model object in accordance with an example embodiment.
Figure 4:
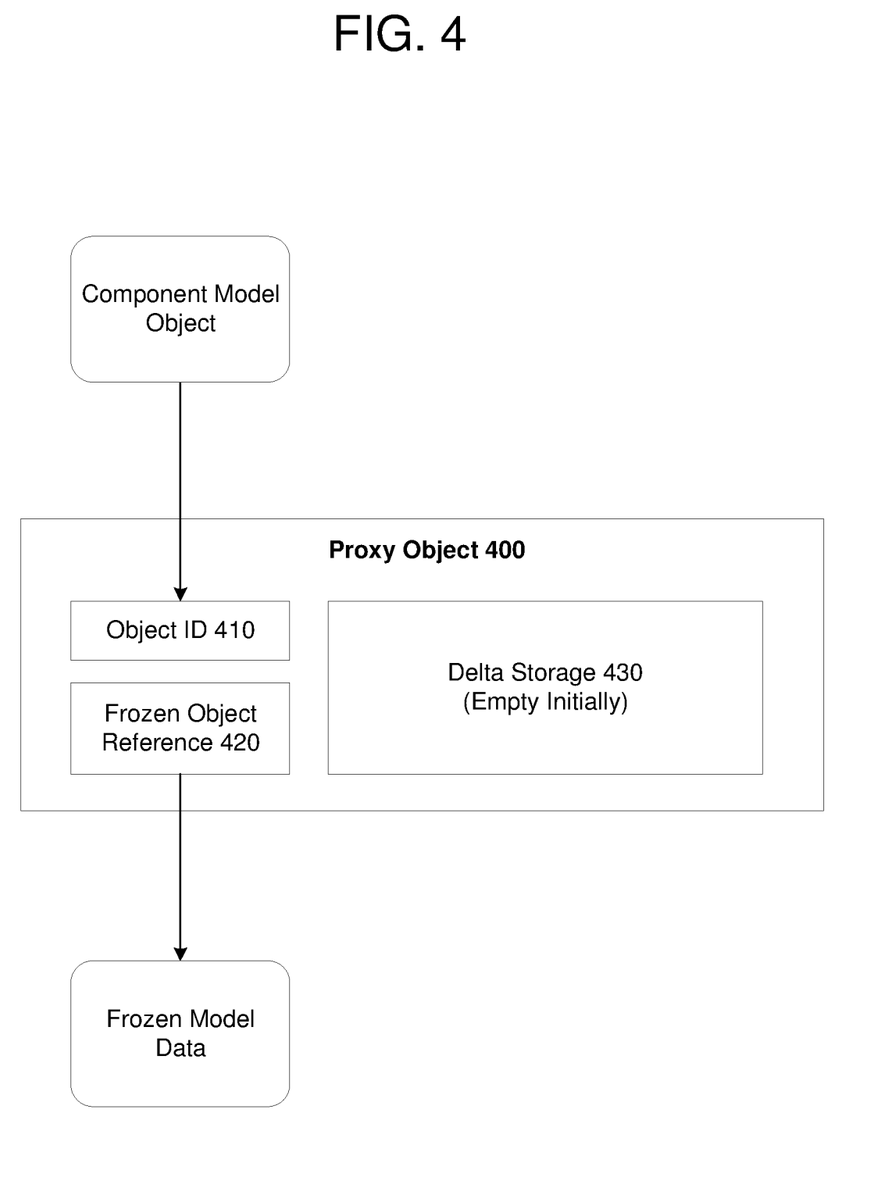
FIG. 4 is a diagram illustrating a proxy object used in the copying process in accordance with an example embodiment.

FIG. 3 illustrates a process 300 of copying a model object in accordance with an example embodiment, and FIG. 4 illustrates a proxy object 400 that may be used in the copying process of FIG. 3, in accordance with an example embodiment. Referring to FIG. 3, a clone of model object 310 is requested, for example, via a command entered via a user interface, a software application triggering the copy, and the like. In response, the process 300 can differentiate between the model/code included in the model object 310 and the underlying attribute storage (property storage) of the object included in the current model object 220, the default model object 230, and the metadata object 240. In this example, the data content is already in the underlying storage, accordingly, the process 300 can skip copying any object except for the root object which in this example is model object 310 to generate a clone model object 320. Initially, no event binding to a user interface may be implemented.

In addition, the copy command may also cause the process 300 to freeze a state of the data associated with the object model 310. In this example, the system may freeze the current model 220 which represents the current state of the object model 310 essentially freezing all underlying data as well such as the default model 230 and the metadata object 240 which also hold data for the object model 310, and which are shown in the example of FIG. 2. By freezing the multi-tiered underlying data objects, the system essentially creates a flat data model representation of the underlying data composition of the model object 310.

According to various embodiments, in order to generate the clone model object 320 of the model object 310, the process 300 may also create two new storage objects referred to as proxy object 312 and proxy object 322. Here, the proxy object 312 is associated with the origin object 310 and the proxy object 322 is associated with the clone model object 320. Both of the proxy object 312 and the proxy object 322 may be set such that they reference the now-frozen former main storage of the origin object which is represented by frozen current object 220 including references to default model 230 and metadata model 240. Next, the original model object 310 can be set to reference the proxy object 312 instead of the current model object 220. Furthermore, the clone model object 320 can be set to reference the proxy object 322. In other words, both the original model object 310 and the clone model object 320 reference the same frozen data store (frozen current model object 220) via different proxy objects (proxy object 312 and proxy object 322, respectively).

Accordingly, the copy process 300 may modify the original model object 310 by breaking a recursive path between the model object 310 and its underlying data and inserting a proxy object 312, without the need to perform a copy of the underlying data storage. The result is that two copies of the same model object (original model object 310 and clone model object 320) now exist and both can be manipulated separately with dynamic changes being stored in the respective proxy objects 312 and 322. This means a clone of an object also affects the original object as well. In case the former main storage of the origin object is empty it is not necessary to change the underlying data of the origin object but use just the referenced parent storage. This can happen when doing a multiple cloning at the same time of the same object. In other words, multiple copies of the model object 310 can be generated off the same frozen object 220. As another example, in a case in which a chain of model-on-model design is created, the system can freeze each referenced storage down the tree and the complete model chain.

FIG. 4 illustrates an example of a proxy object 400 which may correspond to the proxy object 312 and/or the proxy object 322. In this example, the proxy object 400 includes an object ID 410 which may be referenced by a corresponding model object (or a clone model object). Furthermore, the proxy object 400 also includes a frozen data store ID 420 which references a frozen data store of the original model object thereby preserving the underlying data content of the model object at the time of the copy command.

In addition, the proxy object 400 may include a delta storage area 430 which may initially be empty at the time of creation but which may store identification of data that is modified, added, or deleted to/from the object model that references the proxy object 400. In other words, the delta storage area 430 may be a dynamic storage area that stores delta values of the object model that references the proxy object 400 rather than storing a copy of the entire underlying data of the model object. By storing the delta values in the proxy object 400, additional (or newly added) copies of the model object can reference the frozen data store. In some embodiments, if a copy request is received for a clone after the clone has been modified, then the proxy object of the clone can be frozen, and the same process can be repeated as described in FIG. 3 with the clone object taking the place of the original model object and the second clone object being the new clone object.

The cloning process may occur in real-time regardless of the size of the model, which is an advantage over related copy processes which can take significant amounts of time. It may come at the cost of indirect access to properties and increased memory consumption (using objects and lookup maps instead of direct memory structures).

In the example embodiments, the model object may contain an eventing unit to which user interface components can register. The eventing unit may keep track of changes and also notify a central resultset manager when the model object and resultset are no longer in sync. Hence, requesting a resultset may trigger a new server fetch. This allows for decentralized user interface development, where user interface components can change the model object and render it independent from each other. The eventing unit may also be aware of the parent-child nature of the model, hence allowing bubbling of events up the parent-child-chain. This is unnecessary in case for the resultset. Instead, the system can notify the resultset manager directly out of the storage from any changes. In a model-on-model scenario, changes to an underlying model does not necessarily effect the model above. The storage has to filter change notifications from below, when the property exists above or the component is not visible at all. Hence, keeping track of existing objects per layer may be performed as new object below can change the virtual existence on the layer above.

A side-effect of separating storage from the object and unifying access to the storage is the easy way to enable undo/redo, because for every action the reverse action is defined simply by either setting the original value or removing the value completely (in a case in which there was no value before). This information can be saved in a simple list. Some changes are only together valid as a transaction, so an undo/redo step has to take this into account. So, each step may be a list of 1 to n storage actions.

The proxy storage objects allow the easy separation of metadata, default model and current model. Depending on the user requirements, either a full snapshot or only the delta (to the default) of the model may be saved. In the given architecture access to the model for persistency is the object-oriented API which is the same for the user interface developers. The example embodiments may extend the API such that after each access to a primitive property an indicator signals whether the value came from the top level storage or not. If the indicator is provided, it means that this is a delta. If not, there was no change. The indicator can access storage directly. The mechanism may also allow the existing API to remain. The serialization implementation may be extended to skip writing the state for a given property if it is unchanged. Alternatively, the complete serialization format could be changed, just using the storage information directly.

Depending on the context, a model object may represent more than one virtual model. This is most obvious with value help, but also when it comes to represent different visualizations on the same base cube. The core problem here is that even minor changes could require a different resultset. For this, the concept of a virtual query helps. If the construction of such a virtual query model is fast, it might be more easy than tricks inside the server request handler. Cloning and a virtual query are similar concepts. In case of virtual query, the over definition of settings specifically for a visualization could be stored inside a separate storage. Main storage and visualization storage together create the storage for the virtual query.

Figure 5:
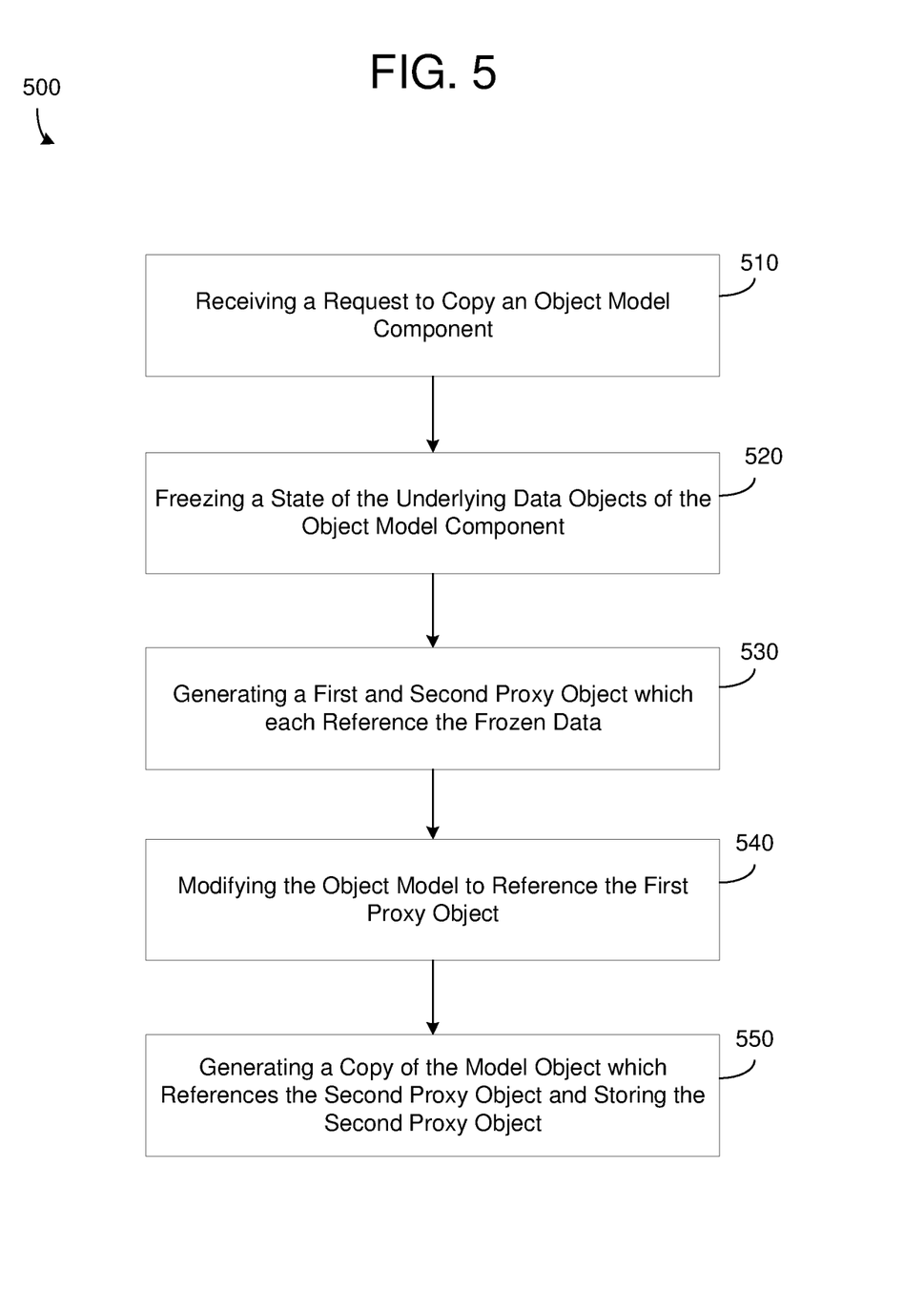
FIG. 5 is a diagram illustrating a method for object copying in accordance with an example embodiment.

FIG. 5 illustrates a method 500 for copying an object within an OOP architecture in accordance with an example embodiment. As an example, the method 500 may be performed by a database node included within a distributed database system. As another example, the method 500 may be performed by a computing device such as a server, a cloud platform, a user device, an on-premises server, and the like. In some examples, the method 500 may be performed by a plurality of devices in combination. Referring to FIG. 5, in 510, the method may include receiving a command to copy an model object. The copy command may be received via a user interface such as a control interface of a program developer, or the like. The model object may include an object of a software program that is designed via an object-oriented architecture. The object may reference or otherwise point to one or more underlying data objects which hold data in a hierarchical manner for the model object.

The model object may include fields (attributes), procedures (methods) and the like. Fields of data include string, Boolean, float, integer, and the like, and procedures may include methods or other software processes of a class of which the object is an instance of. The hierarchical data structure of the model object provides layers of data storage and data access by the model object. Examples of underlying data objects include a current data object representing the current state of data of the model object, a default data object storing default values of attributes and methods of model object such as null, zero, or the like, a metadata model which includes information about the relationship of the object to other objects in the program, information about data and methods included within the object, and the like.

In 520, the method may include freezing a state of the model object and one or more underlying data objects to generate a frozen data store of the model object. For example, the freezing may include saving a state of the model object data as is at a point in time at which the copy command is detected. The frozen data store may include a flat data representation of a plurality of the hierarchical data objects referenced by the model object. The freezing may also prevent the one or more underlying data objects from being modified.

In 530, the method may include generating a first proxy object that references the frozen data store and a second proxy object that references the frozen data store. In addition, in 540, the method may include modifying the model object to reference the first proxy object instead of referencing the one or more underlying data objects. Furthermore, in 550, the method may include generating a copy of the model object that references the second proxy object and storing the copy of the model object. Although not shown in FIG. 5, in some embodiments, the method may further display a copy or a clone of the model object. Also, it should be appreciated that the copy operation may be performed to simultaneously copy a plurality of model objects such as a plurality of objects included in a common program for analytics visualization.

According to various aspects, the original model object may initially reference the composite underlying data store including the current data model of the object and any underlying data objects. To perform the copy command, the original model object is modified. For example, the reference to the composite underlying data store may be broken, the underlying data store may be frozen, and a proxy data object may be inserted between the model object and the underlying data store. Similarly, a proxy object may be created for the copied (cloned) model object and reference to the underlying frozen data store may be set. Accordingly, the only data being copied is the model object with references being changed rather than the underlying composite data store. Accordingly, the copy can be performed significantly faster than when copying the entire model including the underlying data store.

In some embodiments, the first and second proxy objects are initially empty of data for the model object and only include a respective object identifier and a respective reference to the frozen data store. In other words, the proxy object may be a shell or container that simply maintains a pointer to the frozen data store (such as a hash map, etc.) and that does not hold data values for the model object. By inserting the second proxy object between the copy of the model object and the frozen data store, the second proxy object is configured to maintain an object-oriented query definition between the copy of the model object and the frozen data store. In some embodiments, the method may further include detecting changes to the copy of the model object submitted via a user interface, and storing the changes to the copy of the model object in the second proxy object. In some embodiments, the method may further include generating a third proxy object which references the frozen data store, generating a second copy of the model object which references the third proxy object, and storing the second copy of the model object.

Figure 6:
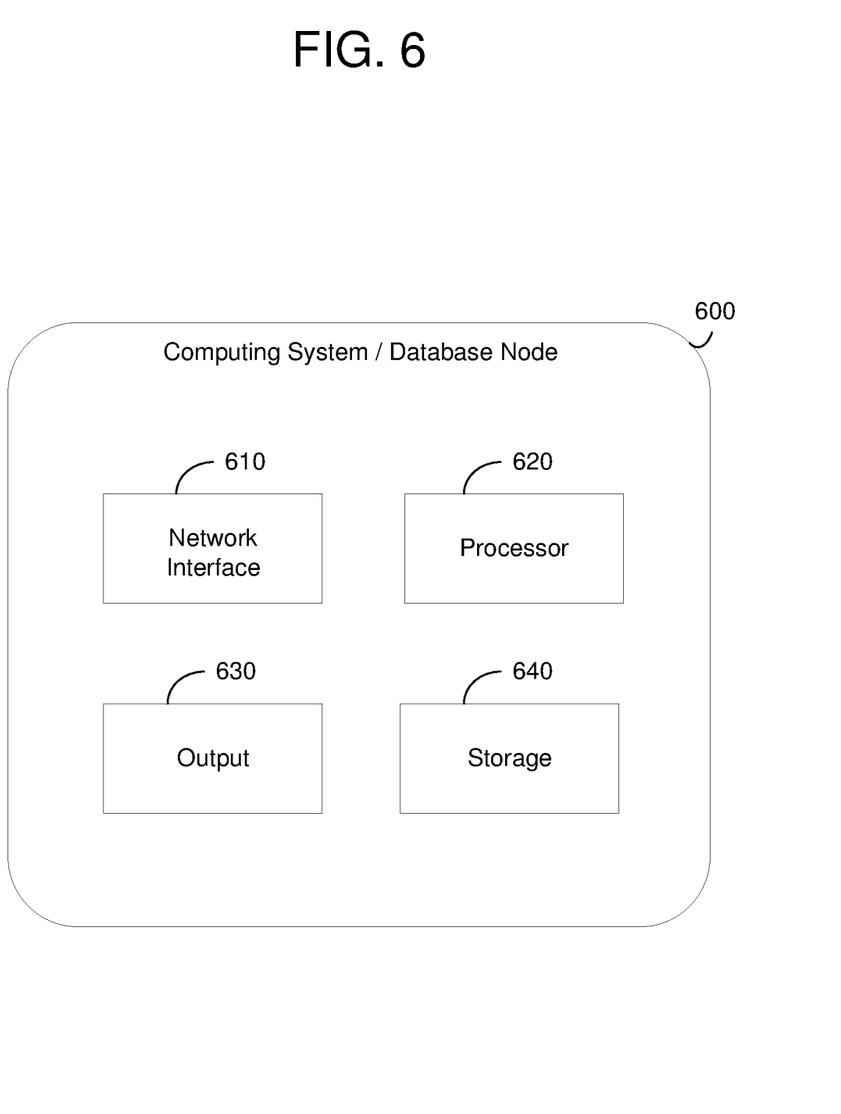
FIG. 6 is a diagram illustrating a computing system in accordance with an example embodiment.

FIG. 6 illustrates a computing system 600 that can perform an object copy operation, in accordance with an example embodiment. For example, the computing system 600 may be a database node, a server, a cloud platform, a user device, or the like. In some embodiments, the computing system 600 may be distributed across multiple devices. Referring to FIG. 6, the computing system 600 includes a network interface 610, a processor 620, an output 630, and a storage device 640 such as an in-memory. Although not shown in FIG. 6, the computing system 600 may also include or be electronically connected to other components such as a display, an input unit, a receiver, a transmitter, a persistent disk, and the like. The processor 620 may control the other components of the computing system 600.

The network interface 610 may transmit and receive data over a network such as the Internet, a private network, a public network, an enterprise network, and the like. The network interface 610 may be a wireless interface, a wired interface, or a combination thereof. The processor 620 may include one or more processing devices each including one or more processing cores. In some examples, the processor 620 is a multicore processor or a plurality of multicore processors. Also, the processor 620 may be fixed or it may be reconfigurable. The output 630 may output data to an embedded display of the computing system 1000, an externally connected display, a display connected to the cloud, another device, and the like. For example, the output 630 may include a port, an interface, a cable, a wire, a board, and/or the like, with input/output capabilities. The network interface 610, the output 630, or a combination thereof, may interact with applications executing on other devices. The storage device 640 is not limited to a particular storage device and may include any known memory device such as RAM, ROM, hard disk, and the like, and may or may not be included within the cloud environment. The storage 640 may store software modules or other instructions which can be executed by the processor 620 to perform the method 500 shown in FIG. 5.

According to various embodiments, the processor 620 may receive or otherwise detect a command to copy a model object comprising a hierarchical object-oriented architecture that references one or more underlying data objects. In response, the processor 620 may freeze a state of a current data object of the model object and one or more underlying data objects to generate a frozen data store of the model object. By freezing the current data object and the underlying data objects, the system essentially creates a flat storage model of the underlying data and the current data. The processor 620 may generate a first proxy object that references the frozen data store and a second proxy object that references the frozen data store, modify the model object to reference the first proxy object instead of referencing the one or more underlying data objects, and generate a copy of the model object that references the second proxy object and store the copy of the model object in the storage device 640.

By freezing the current data object and the underlying data objects, the processor 620 may prevent the current data object and the one or more underlying data objects from being modified. In some embodiments, the first and second proxy objects are initially empty data objects which each include a respective object identifier and a respective reference to the frozen data store. When a copy of the model object is modified or changed the dynamic changes may be stored in the proxy object (i.e., the second proxy object) rather than the underlying frozen data store. Accordingly, the frozen data store may remain unchanged. Furthermore, the second proxy object may maintain an object-oriented query definition between the copy of the model object and the frozen data store because the second proxy object may include an object ID and a reference to the frozen data store. In some embodiments, the one or more underlying data objects comprise a default data object and a metadata object which each store respective data used by the model object in hierarchical format.

In some embodiments, the processor 620 may further detect changes to the copy of the model object submitted via a user interface, and store the changes to the copy of the model object in the second proxy object. In addition, the processor 620 may generate a third proxy object which references the frozen data store, generate a second copy of the model object which references the third proxy object, and store the second copy of the model object in the storage device. The processor 620 may continue to create additional copies of the model object via the same process of using a proxy object and references to the frozen data store.

As will be appreciated based on the foregoing specification, the above-described examples of the disclosure may be implemented using computer programming or engineering techniques including computer software, firmware, hardware or any combination or subset thereof. Any such resulting program, having computer-readable code, may be embodied or provided within one or more non transitory computer-readable media, thereby making a computer program product, i.e., an article of manufacture, according to the discussed examples of the disclosure. For example, the non-transitory computer-readable media may be, but is not limited to, a fixed drive, diskette, optical disk, magnetic tape, flash memory, external drive, semiconductor memory such as read-only memory (ROM), random-access memory (RAM), and/or any other non-transitory transmitting and/or receiving medium such as the Internet, cloud storage, the Internet of Things (IoT), or other communication network or link. The article of manufacture containing the computer code may be made and/or used by executing the code directly from one medium, by copying the code from one medium to another medium, or by transmitting the code over a network.

The computer programs (also referred to as programs, software, software applications, "apps", or code) may include machine instructions for a programmable processor, and may be implemented in a high-level procedural and/or object-oriented programming language, and/or in assembly/machine language. As used herein, the terms "machine-readable medium" and "computer-readable medium" refer to any computer program product, apparatus, cloud storage, internet of things, and/or device (e.g., magnetic discs, optical disks, memory, programmable logic devices (PLDs)) used to provide machine instructions and/or data to a programmable processor, including a machine-readable medium that receives machine instructions as a machine-readable signal. The "machine-readable medium" and "computer-readable medium," however, do not include transitory signals. The term "machine-readable signal" refers to any signal that may be used to provide machine instructions and/or any other kind of data to a programmable processor.

The above descriptions and illustrations of processes herein should not be considered to imply a fixed order for performing the process steps. Rather, the process steps may be performed in any order that is practicable, including simultaneous performance of at least some steps. Although the disclosure has been described in connection with specific examples, it should be understood that various changes, substitutions, and alterations apparent to those skilled in the art can be made to the disclosed embodiments without departing from the spirit and scope of the disclosure as set forth in the appended claims.

What is claimed is:

1. A computing system comprising:
    a storage device; and
    a processor configured to
        receive a command to copy a software model comprising a hierarchical object-oriented architecture that references one or more underlying storage objects storing data and methods used by the software model,
        freeze a state of the one or more underlying storage objects to generate a frozen data store of the software model,
        prevent the one or more underlying storage objects within the frozen data store from being modified,
        generate a first proxy object that references the frozen data store and that is in between the software model and the frozen data store, and generate a second proxy object that also references the frozen data store,
        modify the reference of the software model to reference the first proxy object instead of referencing the one or more underlying storage objects, and
        generate a copy of the software model that references the second proxy object and store the copy of the software model in the storage device,
    wherein subsequent changes to the data and the methods of the software model are stored in the first proxy object and subsequent changes to corresponding data and methods of the copy of the software model are stored in the second proxy object separate from the subsequent changes to the software model stored in the first proxy object.

2. The computing system of claim 1, wherein the first and second proxy objects are initially empty data objects which each include a respective object identifier and a respective reference to the frozen data store.

3. The computing system of claim 1, wherein the second proxy object is generated with an object-oriented query definition between the copy of the software model and the frozen data store that matches an object-oriented query definition between the software model and the frozen data store.

4. The computing system of claim 1, wherein the one or more underlying storage objects comprise a default data object that stores default values of fields of the data and the methods of the software model and a metadata object that stores relationships of objects within the software model.

5. The computing system of claim 1, wherein the frozen data store comprises a flat data representation of a plurality of hierarchical storage objects referenced by the software model.

6. The computing system of claim 1, wherein the processor is further configured to detect changes to the copy of the software model submitted via a user interface, and store the changes in the second proxy object.

7. The computing system of claim 1, wherein the processor is further configured to generate a third proxy object which references the frozen data store, generate a second copy of the software model which references the third proxy object, and store the second copy of the software model in the storage device.

8. A method comprising:
    receiving a command to copy a software model comprising a hierarchical object-oriented architecture that references one or more underlying storage objects storing data and methods used by the software model;
    freezing a state of the one or more underlying data objects to generate a frozen data store of the software model;
    preventing the one or more underlying storage objects within the frozen data store from being modified;
    generating a first proxy object that references the frozen data store and that is in between the software model and the frozen data store, and generating a second proxy object that also references the frozen data store;
    modifying the reference of the software model to reference the first proxy object instead of referencing the one or more underlying storage objects; and
    generating a copy of the software model that references the second proxy object and storing the copy of the software model object,
    wherein subsequent changes to the data and the methods of the software model are stored in the first proxy object and subsequent changes to corresponding data and methods of the copy of the software model are stored in the second proxy object separate from the subsequent changes to the software model stored in the first proxy object.

9. The method of claim 8, wherein the first and second proxy objects are initially empty data objects which each comprise a respective object identifier and a respective reference to the frozen data store.

10. The method of claim 8, wherein the second proxy object is generated with an object-oriented query definition between the copy of the software model and the frozen data store that matches an object-oriented query definition between the software model and the frozen data store.

11. The method of claim 8, wherein the one or more underlying storage objects comprise a default data object that stores default values of fields of the data and the methods of the software model and a metadata object that stores relationships of objects within the software model.

12. The method of claim 8, wherein the frozen data store comprises a flat data representation of a plurality of hierarchical storage objects referenced by the software model.

13. The method of claim 8, further comprising detecting changes to the copy of the software model submitted via a user interface, and storing the changes in the second proxy object.

14. The method of claim 8, further comprising generating a third proxy object which references the frozen data store, generating a second copy of the software model which references the third proxy object, and storing the second copy of the software model.

15. A non-transitory computer-readable storage medium storing program instructions that when executed cause a processor to perform a method comprising:
  receiving a command to copy a software model comprising a hierarchical object-oriented architecture that references one or more underlying storage objects storing data and methods used by the software model;
  freezing a state of the one or more underlying data objects to generate a frozen data store of the software model;
  preventing the one or more underlying storage objects within the frozen data store from being modified;
  generating a first proxy object that references the frozen data store and that is in between the software model and the frozen data store, and generating a second proxy object that also references the frozen data store;
  modifying the reference of the software model to reference the first proxy object instead of referencing the one or more underlying storage objects; and
  generating a copy of the software model that references the second proxy object and storing the copy of the software model object,
  wherein subsequent changes to the data and the methods of the software model are stored in the first proxy object and subsequent changes to corresponding data and methods of the copy of the software model are stored in the second proxy object separate from the subsequent changes to the software model stored in the first proxy object.

16. The non-transitory computer readable medium of claim 15, wherein the first and second proxy objects are initially empty data objects which each comprise a respective object identifier and a respective reference to the frozen data store.

17. The non-transitory computer readable medium of claim 15, wherein the second proxy object is generated with an object-oriented query definition between the copy of the software model and the frozen data store that matches an object-oriented query definition between the software model and the frozen data store.

* * * * *